United States Patent [19]

Chambers

[11] Patent Number: 4,559,841

[45] Date of Patent: Dec. 24, 1985

[54] GEAR TRAIN HAVING AN INTERNAL GEAR MECHANISM

[75] Inventor: Robert O. Chambers, Peoria, Ill.

[73] Assignee: Caterpillar Tractor Co., Peoria, Ill.

[21] Appl. No.: 653,810

[22] PCT Filed: Feb. 2, 1983

[86] PCT No.: PCT/US83/00152

§ 371 Date: Feb. 2, 1983

§ 102(e) Date: Feb. 2, 1983

[87] PCT Pub. No.: WO83/03291

PCT Pub. Date: Sep. 29, 1983

Related U.S. Application Data

[63] Continuation-in-part of Ser. No. 648,231, Mar. 15, 1982, abandoned.

[30] Foreign Application Priority Data

Mar. 15, 1982 [WO] PCT Int'l Appl. ........... US82/00320

[51] Int. Cl.[4] .................... F16H 15/50; F16H 37/06; F16H 15/16; F16H 15/00

[52] U.S. Cl. ........................................ 74/191; 74/193; 74/190; 74/796; 74/690

[58] Field of Search ............... 74/190, 190.5, 191, 74/208, 212, 690, 721, 800, 214, 216, 192, 193

[56] References Cited

U.S. PATENT DOCUMENTS

| | | | |
|---|---|---|---|
| 3,159,056 | 12/1964 | Blazo | 74/800 |
| 4,233,859 | 11/1980 | Kemper | 74/690 |
| 4,235,127 | 11/1980 | Kemper | 74/796 |
| 4,238,976 | 12/1980 | Kemper | 74/682 |
| 4,258,581 | 3/1981 | Kemper et al. | 74/192 |
| 4,262,555 | 4/1981 | van der Lely | 74/690 |
| 4,282,774 | 8/1981 | van der Lely | 74/690 |
| 4,369,667 | 1/1983 | Kemper | 74/191 |
| 4,378,708 | 4/1983 | Pouliot | 74/191 |

*Primary Examiner*—Lawrence J. Staab
*Assistant Examiner*—M. Bednarek
*Attorney, Agent, or Firm*—Charles E. Lanchantin, Jr.

[57] ABSTRACT

A gear train having an internal gear mechanism is disclosed for use with a continuously variable transmission unit of the nutating traction drive type. The gear train includes a body rotatable about a central axis, a first pinion gear rotatably mounted on the body on an inclined axis, a second pinion gear rotatably mounted on the central axis, and either one or two tapered internal gears rotatably mounted on the body on a nutating axis for transferring torque between the pinion gears. The gear train is simple, compact, and relatively efficient.

19 Claims, 3 Drawing Figures

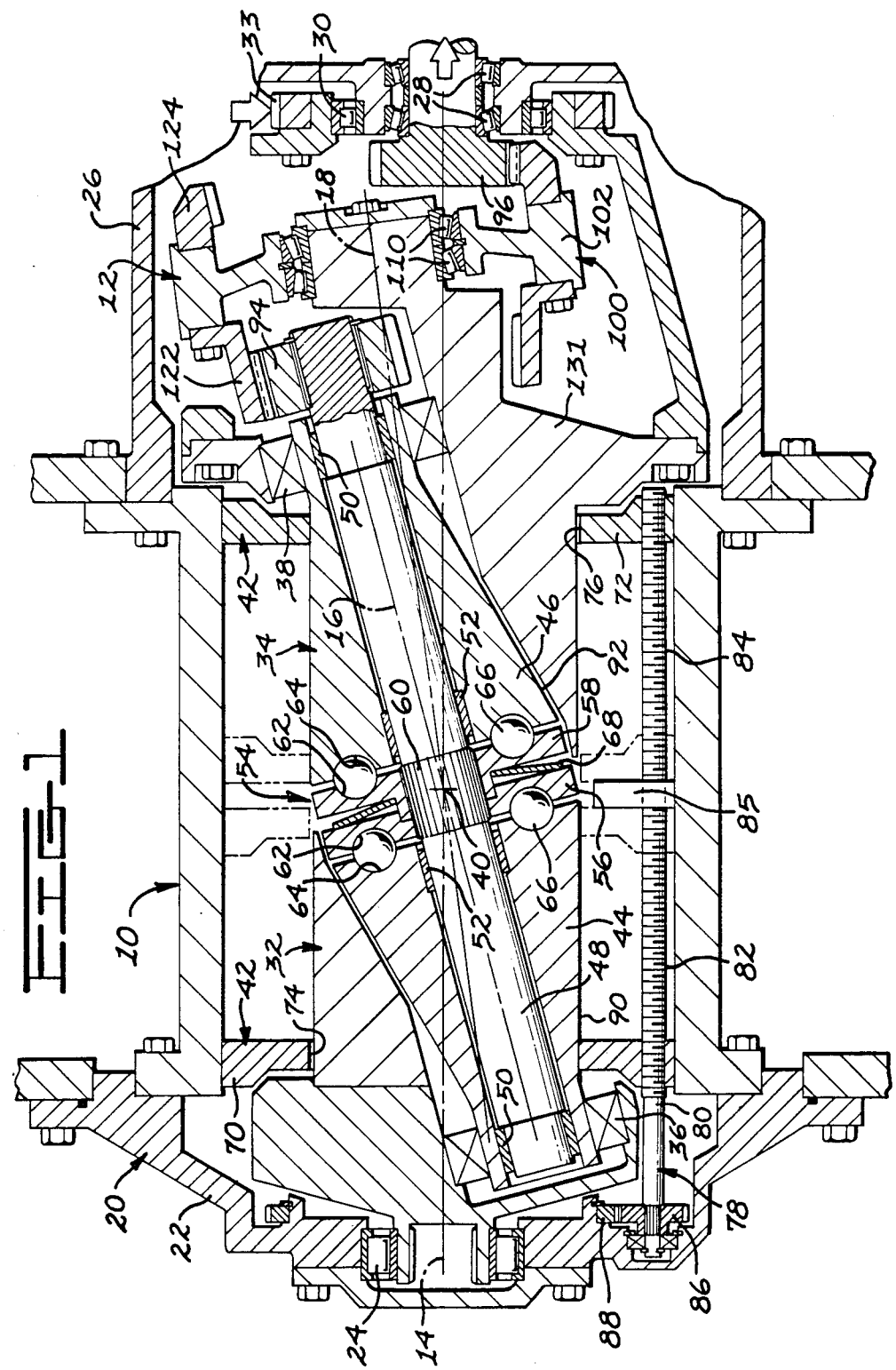

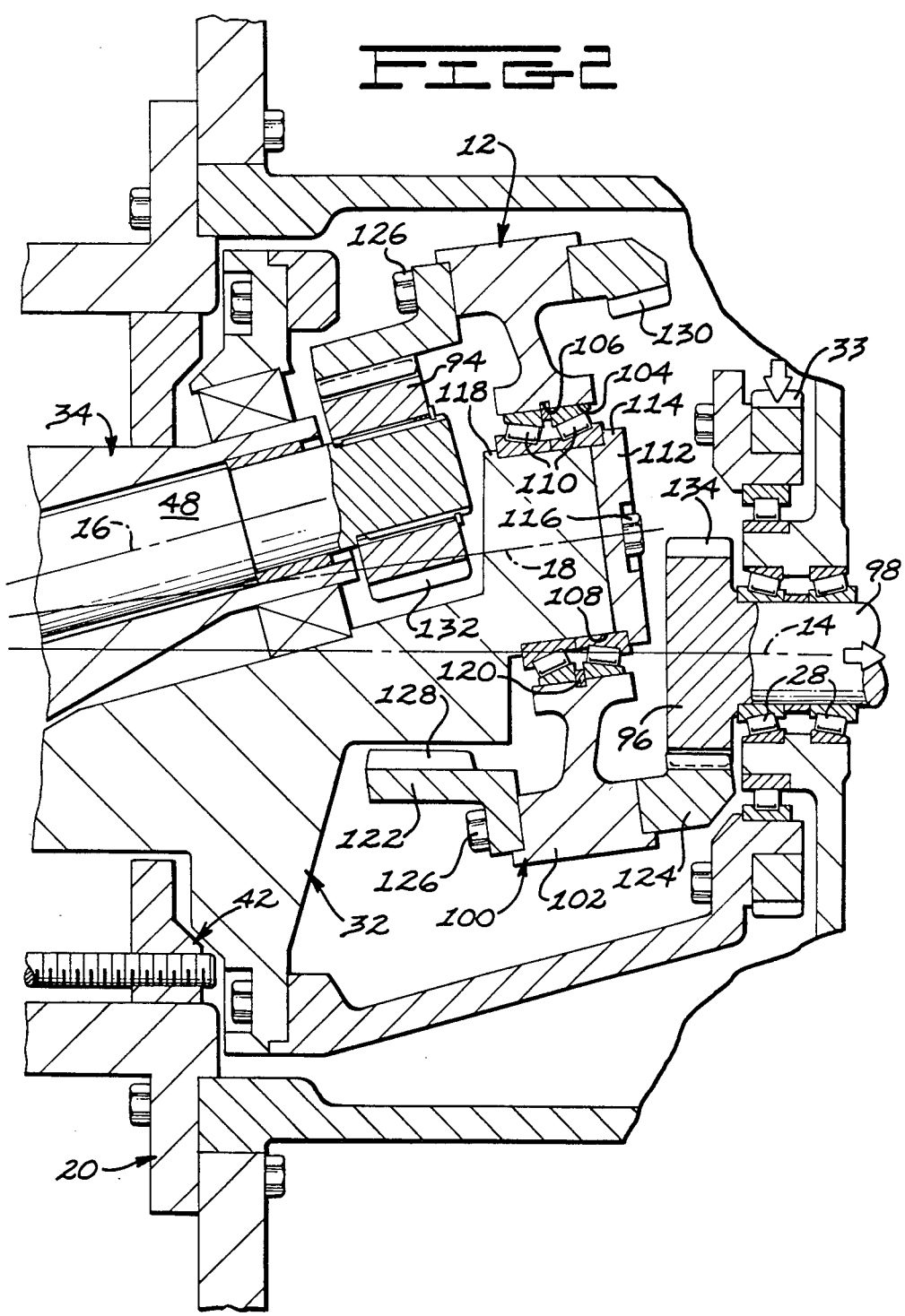

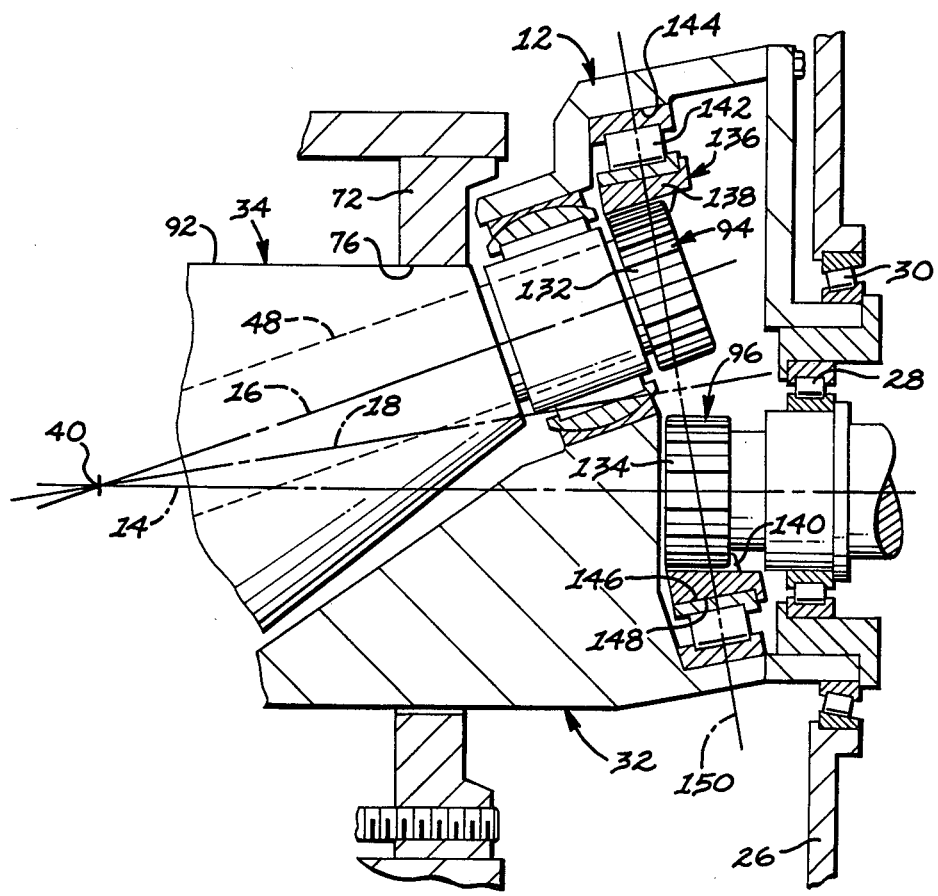

GEAR TRAIN HAVING AN INTERNAL GEAR MECHANISM

This is a continuation-in-part of application Ser. No. 648,231 filed Mar. 15, 1982 by Robert O. Chambers, and now abandoned.

TECHNICAL FIELD

This invention relates generally to a gear train having an internal gear mechanism, and more particularly to a gear train for a continuously variable transmission unit to expand the useful range thereof.

BACKGROUND ART

The present invention is particularly useful in a plurality of embodiments of continuously variable transmission units of the type disclosed in U.S. Pat. No. 4,152,946 issued May 8, 1979 to Yves Kemper assigned to the Vadetec Corporation of Troy, Michigan. Such continuously variable transmission units, hereafter referred to as CVT units, are of the traction drive type and offer considerable promise for vehicular use.

In the general type of CVT unit referred to in the above-designated patent three working bodies operate to transmit torque to a rotatable output member at a continuously variable output/input speed ratio throughout a preselected range. The working bodies are represented by a first body having a pair of axially movable internal traction surfaces of revolution about a central axis, a second body having a pair of external cone-like traction surfaces of revolution about an inclined axis intersecting the central axis, and a third body journalled for rotation about the central axis and carrying the second body such that rotational torque applied to the third body causes the nutational movement of the inclined axis. If the first body is held stationary as a reaction and the third body is driven as an input member, the second body can have a nutating pinion gear coupled thereto which serves as the output to a gear train. Axial movement of the first body with respect to the cone-like traction surfaces of the second body results in modifying the speed ratio to the output desired. The technical performance and operating parameters of these transmissions are described in an American Society of Mechanical Engineers Article entitled "Performance of a Nutating Traction Drive" by P. Elu and Y. Kemper of Aug. 18–21, 1980 and identified as Paper No. 80-C2/DET-63.

The physical characteristics of many of these CVT units are such that relatively high efficiencies are obtained through a relatively narrow range of speed ratios. But, by linking an output gear train to two of the three bodies the range of speed ratios of the CVT unit can be broadened while maintaining relatively high efficiencies. One prior output gear train adapted to broaden the speed range is illustrated in FIGS. 1 and 7 of aforementioned U.S. Pat. No. 4,152,946 and embodies a set of three conical convex gears or external bevel gears having a common apex for connecting the second and third working bodies to an output shaft having one of the bevel gears thereon. Unfortunately, that set of external bevel gears exhibits a considerable gear tooth friction loss which decreases the overall efficiency of the CVT unit. Moreover, the set of external bevel gears is crowded so that the amount of space left for the support bearings for these gears is minimal. Still further, it is a relatively complex matter to adjust the axial positioning of the external bevel gears with respect to one another.

Accordingly, it would be advantageous to provide an improved gear train for use with a CVT unit of the aforementioned type which would broaden the speed range thereof, which would be of high efficiency such as by exhibiting an efficient gear tooth mesh, which would be relatively compact and yet have sufficient space for the supporting bearings, and which would be simple and economical in construction.

The present invention is directed to a gear train overcoming one or more of the problems as set forth above.

DISCLOSURE OF THE INVENTION

In one aspect of the present invention a gear train is provided for a body rotatable about a central axis, a first pinion gear rotatably mounted on the body on an inclined axis, and a second pinion gear rotatably mounted on the central axis. Advantageously, the gear train includes an internal gear mechanism rotatably mounted on the body on a nutating axis for transferring torque between the body, the first pinion gear and the second pinion gear.

In another aspect of the present invention a gear train is provided for a body rotatable about a central axis, a first pinion gear rotatably mounted on the body on an inclined axis intersecting the central axis, and a second pinion gear rotatably mounted on the central axis, with the gear train including an internal gear mechanism having an internally tapered gear rotatably mounted on the body with the first and second pinion gears being intermeshingly engaged with the internally tapered gear.

In another aspect of the present invention a gear train is provided for a body rotatable about a central axis, a first pinion gear rotatably mounted on the body on an inclined axis intersecting the central axis, and a second pinion gear rotatably mounted on the central axis, with the gear train including an internal gear mechanism having first and second internal gears rotatably mounted on the body as a unit such that the first internal gear is connected to the first pinion gear and the second internal gear is connected to the second pinion gear.

The gear train of the present invention desirably includes an internal gear mechanism having either one internal gear or a juxtaposed pair of internal gears which are rotatably mounted on an input body of a CVT unit on a nutating axis. Preferably, straight tapered internal gear teeth are used which are intermeshed with straight spur gear teeth of a first pinion gear associated with the inclined working body of the CVT unit and straight spur gear teeth of a second or output pinion gear. This results in a relatively compact gear train having a particularly efficient gear tooth intermesh construction, and yet serves the primary function of extending the speed ratio range of the associated CVT unit over that of a single working body output connection, for example.

BRIEF DESCRIPTION OF THE DRAWINGS

FIG. 1 is a diagrammatic, longitudinal sectional view of a CVT unit incorporating a gear train constructed in accordance with the present invention at one end thereof;

FIG. 2 is a diagrammatic and substantially enlarged longitudinal sectional view of the gear train portion of FIG. 1 to better illustrate details thereof; and FIG. 3 is a diagrammatic, longitudinal sectional view of a second embodiment internal gear mechanism for the gear train of the present invention.

BEST MODE FOR CARRYING OUT THE INVENTION

Referring initially to FIG. 1, a CVT unit 10 of the nutating traction drive type includes a gear train designated generally by the reference numeral 12 at the right side thereof when viewing the drawing which is constructed in accordance with the present invention. The longitudinal cross-sectional view illustrated includes a plane containing a primary central axis 14, a secondary inclined axis 16 and a third nutating axis 18.

The CVT unit 10 includes a frame or housing 20 including a left end portion 22 supporting a bearing assembly 24 and a right end portion 26 supporting a first bearing assembly 28 and a second bearing assembly 30. The first of three working bodies of the CVT unit includes a crank-like alpha body 32 which is journalled in the bearing assemblies 24,30 for rotation about the central axis 14. In the instant embodiment the alpha body or input body 32 is powerably rotated by its connection to a conventional engine or motor driven power train, not shown, at an input gear 33. However, the alpha body may be driven at the opposite end thereof equally well. The second working body includes a nutatable beta body identified generally by the reference numeral 34 supported by a pair of end bearing assemblies 36,38 within the alpha body 32 for rotation about the inclined axis 16 which intersects the central axis at an intersecting point 40. The third working body includes an omega body identified generally by the reference numeral 42 which is concentric with and axially movable with respect to the central axis for varying the speed ratio of the CVT unit.

More particularly, the nutatable beta body 34 includes a pair of oppositely convergent conical or cone-like members 44,46 supported for a preselected degree of both axial and rotational movement relative to a nutating shaft 48. For this purpose, a first pair of cylindrical sleeve bearing members 50 are secured to the shaft for freely carrying the distal or small ends of the conical members, and a second pair of cylindrical sleeve bearing members 52 freely carry the proximal or large ends of the conical members on the shaft. A ball and ramp mechanism 54 is located generally centrally of the shaft and includes first and second annular collar members 56,58 which are nonrotatably connected to the shaft by a spline connection 60. Each of the collars has a plurality of appropriately ramped pockets 62 defined therein which face a corresponding plurality of similarly ramped pockets 64 defined in the end face of each of the conical members. A force transmitting ball 66 is received within each of the facing pockets 62,64 and resilient spring means 68 disposed between the collars continually biases the collars apart and generally axially away from the intersect point 40 centrally of the shaft 48.

The omega body 42 includes a pair of axially adjustable traction rings 70,72 defining interior omega rolling surfaces 74,76 which are surfaces of revolution about the central axis 14. These omega rolling surfaces may be crowned in cross section but generally have a relatively constant radius. The traction rings are nonrotatably connected to the housing 20 and are symmetrically movable toward and away from each other along the central axis by a suitable adjustment mechanism 78. In the instant embodiment the adjustment mechanism includes a plurality of parallel adjustment rods 80 having left and right hand threads 82,84 on the opposite ends thereof which are screwthreadably received in the traction rings. Each of the rods is freely supported in a bearing block 85 for rotation relative to the housing 20. An input pinion gear 86 secured to each rod is intermeshingly engaged with a controlling ring gear 88, so that with rotation of the controlling ring gear about the central axis in one direction the traction rings will be urged toward one another to the central positions illustrated in phantom outline. When the controlling ring gear is rotated in the opposite direction the traction rings will be moved away from one another to the solid line positions illustrated in FIG. 1.

Thus, to effect a relative speed change, beta rolling surfaces 90,92 defined respectively on the conical members 44,46 make engagement with the omega rolling surfaces 74,76 of the traction rings 70,72 along symmetrically spaced apart points along the central axis. When the omega body 42 is restrained against movement about its axis the relative speed relationship of the rotating alpha body 32 and the nutating shaft 48 is related to the internal radius of the omega rolling surfaces 70,72 and the external radius of the beta rolling surfaces 90,92 in contact with the traction rings 70,72. The ball and ramp mechanism 54 serves to continually bias the conical members away from each other along the inclined axis and into preselected load bearing engagement with the traction rings. The operation of the CVT unit 10 so far described is similar structurally and functionally to the general disclosure of U.S. Pat. No. 4,152,946 mentioned above and to the disclosure of U.S. Pat. No. 4,280,369 issued July 28, 1981 to Harvey N. Pouliot relating to a ball and ramp mechanism for a CVT unit of the type illustrated in FIG. 1, the full contents of which are incorporated by reference into the instant specification.

Turning now to the gear train 12 shown best in FIG. 2, it can be noted to include a first pinion gear 94 connected for joint rotation with the nutating shaft 48. Thus, the first pinion gear is indirectly rotatably mounted on the alpha body 32 on the inclined axis 16. A second pinion gear 96 integrally connected to an output shaft 48 is rotatably mounted in the housing 20 in the bearing assembly 28 along the central axis 14. In accordance with the present invention an internal gear means or an internal gear mechanism 100 is provided for transferring torque between the alpha body 32, the first pinion gear 94 and the second pinion gear 96, with the internal gear means being rotatably mounted on the alpha body on the nutating axis 18.

The internal gear mechanism 100 includes an annular supporting hub 102 having an internal cylindrical bore 104 and a retaining ring groove 106 defined in the bore. A cylindrical bearing seat 108 is defined by the alpha body 32 concentric with the nutating axis 18, and a pair of opposed tapered roller bearing assemblies 110 are disposed on the seat. A retaining cap 112 defining an annular shoulder 114 is releasably secured to the alpha body by one or more screwthreaded fasteners or bolts 116 such that the roller bearing assemblies are positively clamped in place against an opposite annular shoulder 118 formed in the alpha body. A thrust absorbing ring 120 is received in the groove 106 and serves to retain the outer races of the bearing assemblies in a proper centralized location with the hub.

The internal gear mechanism 100 further includes first and second internal gears 122 and 124 releasably secured to the opposite outer end faces of the hub by a plurality of fasteners or bolts 126 arranged peripherally around the hub. Each of the internal gears 122,124 has a plurality of internal gear teeth 128,130 which are preferably arranged in two cones or in a common cone and thus are tapered. I prefer that straight gear teeth be used, and by the term "straight"0 it is meant that the gear teeth are aligned with a plane through the axis of rotation thereof. This permits the teeth 132,134 of the first and second pinion gears 94,96 to be straight spur gear teeth for simplicity of construction and for minimizing thrust forces within the gear train.

INDUSTRIAL APPLICABILITY

In a first mode of operation of the CVT unit 10 corresponding to the wide positioning of the traction rings 70,72 shown in FIG. 1, the output shaft 98 is rotated at minimum torque and at maximum speed conditions. For example, with the traction rings being held stationary and the alpha body 32 being rotated by a conventional power means, not shown, at 1 rpm in a counterclockwise (CCW) direction when viewing the drawing from the right along central axis 14, the internal gear mechanism 100 can be rotated at about 0.05 rpm in the clockwise (CW) direction in addition to its nutating motion, the beta body 34 can be rotated at about 1.0 rpm in the clockwise (CW) direction in addition to its nutating motion, and the output shaft at about 1.33 rpm in the clockwise (CW) direction.

In a second mode of operation of the CVT unit 10 corresponding to the juxtaposed positioning of the traction rings 70,72 as shown in phantom lines in FIG. 1, the output shaft 98 is rotated at maximum torque and at minimum speed conditions. With the traction rings again being held stationary and the alpha body 32 being rotated at 1 rpm in a counterclockwise (CCW) direction, the internal gear mechanism 100 can be rotated at about 0.42 rpm in the counterclockwise (CCW) direction, the beta body 34 can be rotated at about 0.11 rpm in the clockwise (CW) direction, and the output shaft 98 at about 0.30 rpm in the clockwise direction.

The above designated extremes of the speed ratio range of the CVT unit 10 and gear train 12 is based upon a ratio change of the external beta rolling surfaces 44,46 divided by the interior omega rolling surfaces 74,76 between about 0.5 and 0.9, and the number of the gear teeth 132,128,130,134 to be respectively 21,40,40 and 18 for a 7/6 ratio.

It can thus be appreciated that the CVT unit 10, and particularly the disposition of the traction rings 70,72 along the central axis 14 is effective to cause the conical members 44,46 to rotate the nutating shaft 48 and to change the angular velocity of the first pinion gear 94 relative to the alpha body 32 through a preselected range. Moreoever, this range can be modified by proper selection of the rolling diameters involved. The construction parameters of the gear train 12 used therewith can also be modified to change the overall characteristics applied to the output shaft 98.

If desired, the gear train 12 can be modified such that the first and second pinion gears 94,96 are external straight bevel gears, and the first and second internal gears 122,124 are internal straight bevel gears having a common apex at the intersection point 40. A still further modification would be to make the gear teeth of all four of these bevel gears spiral bevel gear teeth. The nutating axis 18 need not be in a common plane with the central axis 14 and the inclined axis 16 in all of the embodiments, but still would be generally intermediate or between them when viewing the common plane at a right angle.

A second embodiment of the present invention is illustrated in FIG. 3 which employs an internal gear mechanism 136 having but a single internally tapered gear 138. In FIG. 3 components similar in function to those described with respect to the first embodiment are identified by the same reference numbers.

In the gear train 12 of FIG. 3 the reaction of the beta rolling surface 92 against the rolling surface 76 of the traction ring 72 as the alpha body 32 is rotated causes the nutating shaft 48 and first pinion gear 94 to be driven as described above with respect to the first embodiment. However, the output torque is transferred from the first pinion gear 94 to the second pinion gear 96 solely through a plurality of preferably straight, internally tapered gear teeth 140. A rolling bearing assembly 142 is pressed into an internal cylindrical seat 144 formed within the alpha body and has an internal cylindrical surface 146 concentric with the nutating axis 18 for receiving a corresponding external cylindrical surface 148 formed on the internal gear. Thus, in the second embodiment the internal gear 138 is externally supported for rotation within the alpha body, whereas in the first embodiment the internal gear mechanism 100 is internally supported by the rolling bearing assemblies 110 on the alpha body.

The construction of the internal gear mechanism 136 is not only simple and economical, but also is of narrow width for compactness along the central axis 14. For example, note that the pinion gears 94,96 of FIG. 3 are located generally in a common nutating plane 150 normal to the nutating axis 18 and passing centrally through the bearing assembly 142. In contrast, the corresponding pinion gears 94,96 of FIG. 2 are spaced axially apart. While I prefer that the pinion gears of FIG. 3 be substantially similar cylindrical spur gears with straight teeth, I contemplate that minor modifications can be made to one or both of them such as by tapering them or crowning them to better match the teeth of the internally tapered gear 138. The pinion gears 94,96 can be of unequal diameter and can have unequal numbers of teeth, in which event I contemplate reorienting the nutating axis 18 to either an offset state so that it does not pass through the intersecting point 40 and/or to a position not angularly bisecting the angle between the central and inclined axes 14,16. Preferably, the three axes 14, 16 and 18 should be maintained in a common plane, with the nutating axis being generally intermediate the other two axes.

From the foregoing it can be appreciated that the gear train 12 and internal gear mechanisms 100 and 136 of the present invention are simple and rugged in construction, are axially and radially compact, are of a construction sufficient for spacious installation of the adequately sized supporting bearings, and are of a relatively high efficiency because an internal-external gear tooth mesh has comparatively lower gear tooth friction losses than an external-external gear tooth mesh. Since the first and second pinion gears preferably have straight gear teeth, the axial adjustment problems associated with conical or bevel gear interfaces are eliminated. Yet all of these advantages are accomplished while providing the same range broadening and ratio characteristics of other prior art gear trains associated with CVT units of the nutating traction drive type.

Other aspects, objects and advantages will become apparent from a study of the specification, drawings and appended claims.

I claim:

1. In a gear train of the type having a body rotatable about a central axis, a first pinion gear rotatably mounted on the body on an inclined axis intersecting the central axis, and a second pinion gear rotatably mounted on the central axis, the improvement comprising:

internal gear means for transferring torque between the body, the first pinion gear and the second pinion gear, the internal gear means being rotatably mounted on the body on a nutating axis maintained generally between the central axis and the inclined axis.

2. The gear train of claim 1 wherein the internal gear means includes first and second internal gears, the first internal gear being connected to the first pinion gear, and the second internal gear being connected to the second pinion gear.

3. The gear train of claim 2 wherein each of the first and second internal gears has a plurality of tapered internal gear teeth.

4. The gear train of claim 3 wherein the gear teeth are straight.

5. The gear train of claim 1 wherein the first and second pinion gears individually have a plurality of straight spur gear teeth.

6. The gear train of claim 1 wherein the body and the first pinion gear are portions of a continuously variable transmission unit.

7. The gear train of claim 6 wherein the continuously variable transmission unit is of the nutating traction drive type.

8. The gear train of claim 1 wherein the interal gear means includes a single internally tapered gear, the first and second pinion gears being intermeshingly engaged with the internally tapered gear.

9. The gear train of claim 1 wherein the internal gear means includes an annular hub, and first and second internal gears individually releasably connected to the hub on the opposite sides thereof.

10. The gear train of claim 9 wherein the internal gear means includes bearing means for rotatably connecting the hub to the body.

11. The gear train of claim 1 wherein the central axis, the inclined axis and the nutating axis are in a common plane.

12. The gear train of claim 1 wherein the body is the input member, the second pinion gear is the output member, and means are provided for changing the angular velocity of the first pinion gear relative to the body through a preselected range.

13. In a gear train of the type having a body rotatable about a central axis, a first pinion gear rotatably mounted on the body on an inclined axis intersecting the central axis, and a second pinion gear rotatably mounted on the central axis, the improvement comprising:

an internal gear mechanism including an internally tapered gear rotatably mounted on the body, the first pinion gear and the second pinion gear being intermeshingly engaged with the internally tapered gear.

14. The gear train of claim 13 wherein the first and second pinion gears individually have a plurality of straight teeth.

15. The gear train of claim 13 wherein the first and second pinion gears are substantially cylindrical spur gears.

16. The gear train of claim 13 including rolling bearing means for rotatably mounting the internally tapered gear within the body on a nutating axis generally intermediate the central axis and the inclined axis.

17. A gear train having a internal gear mechanism comprising:

a body rotatable about a central axis;
   a first pinion gear rotatably mounted on the body on an inclined axis intersecting the central axis;
   a second pinion gear rotatably mounted on the central axis; and
   first and second tapered internal gears rotatably mounted on the body as a unit on a nutating axis, the first tapered internal gear being intermeshed with the first pinion gear and the second tapered internal gear being intermeshed with the second pinion gear.

18. The gear train of claim 17 wherein the nutating axis is in a common plane with the central and inclined axes.

19. The gear train of claim 17 wherein the first and second pinion gears and the first and second tapered internal gears each have a plurality of straight teeth.

* * * * *